United States Patent [19]

Spitzer

[11] 4,380,993
[45] Apr. 26, 1983

[54] COMBINED SOLAR COLLECTOR AND STORAGE POND

[76] Inventor: Hermann J. Spitzer, 8004 Arcade St. (Fairfax County), Lorton, Va. 22079

[21] Appl. No.: 172,901

[22] Filed: Jul. 28, 1980

[51] Int. Cl.³ .............................................. F24J 3/02
[52] U.S. Cl. .................... 126/415; 126/416; 126/426; 126/422; 126/437
[58] Field of Search ............... 126/415, 416, 422, 437, 126/426

[56] References Cited

U.S. PATENT DOCUMENTS

| | | | |
|---|---|---|---|
| 3,077,190 | 2/1963 | Allen | 126/415 |
| 3,910,490 | 10/1975 | Saypalia | 126/416 |
| 3,949,095 | 4/1976 | Pelehach et al. | 126/426 |
| 4,027,821 | 6/1977 | Hayes et al. | 126/422 |
| 4,158,355 | 6/1979 | Spitzer | 126/444 |
| 4,227,511 | 10/1980 | Margen et al. | 126/415 |
| 4,256,089 | 3/1981 | Lewis et al. | 126/422 |
| 4,258,661 | 3/1981 | Margen | 126/416 |

*Primary Examiner*—Carroll B. Dority, Jr.
*Attorney, Agent, or Firm*—Nathan Edelberg; Robert P. Gibson

[57] ABSTRACT

The deep storage pond may comprise a flexible plastic bag or a rigid plastic compartment supported by a containment structure which may comprise insulating and supporting walls underground with an open top. The solar energy collector may comprise a smaller absorber bag or compartment of the same material which can be mounted atop the storage pond. Black-dyed water is used as the absorbing and storage medium and when the absorber bag temperature reaches an optimum value the contents thereof are transferred to the storage pond and subsequently replaced by cooler water from the bottom of the storage pond. The absorber means may be remotely located from the storage means.

14 Claims, 5 Drawing Figures

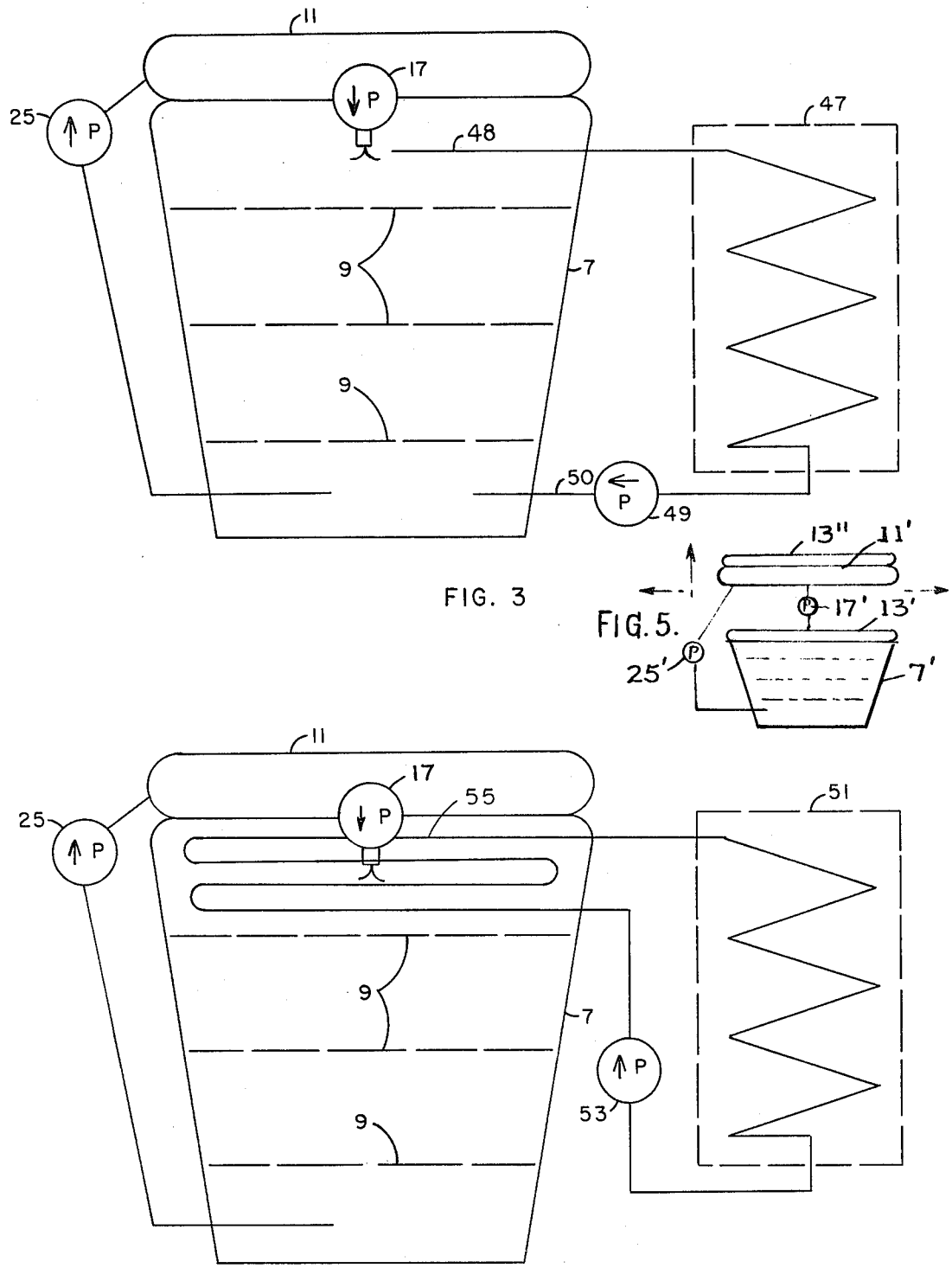

COMBINED SOLAR COLLECTOR AND STORAGE POND

The invention described herein may be manufactured and used by or for the U.S. Government for governmental purposes without the payment of any royalties therefor or thereon.

BACKGROUND OF THE INVENTION

The field of this invention is solar energy collection and storage, and more particularly it relates to a novel unitary structure which combines the function of a solar energy collector and a means to store collected energy with minimal loss.

The most common form of a conventional solar pond includes means for releasing salt near the bottom thereof for increasing the water density there in order to establish an inversion layer, thus preventing convection currents which would otherwise carry the warmer water toward the top of the pond where its energy could easily dissipate via radiation, evaporation and air convection currents. Such salt ponds have certain disadvantages, for example, the desired internal temperature gradient is often disturbed by wall convection phenomena, high rates of energy extraction, for example, from heat exchangers connected thereto, or from high rates of solar energy input. Also, the usually open pool surface is subject to heat loss through evaporation.

The present invention has many of the advantages of these prior art solar ponds while lacking the disadvantages thereof.

SUMMARY OF THE INVENTION

The combined solar energy collector and solar energy storage pond of the present invention comprises a containment structure preferrably comprising a hole on the ground lined with rigid material of good insulating quality and of sufficient strength to support the contents, which is mainly a black radiation absorbing fluid, usually black-dyed water. Most of the interior of the containment structure comprises the storage pond which may comprise a flexible, clear plastic bag contoured to the walls thereof and filled or nearly filled with the aforementioned radiation absorbing fluid. On top of the large storage bag is an absorber bag which comprises the solar energy collector. The absorber bag is either a separate bag floating atop the storage bag or simply the upper compartment of the storage bag. Both embodiments are feasible, but for construction and operational purposes separate bags may be more practical. Near the center of these two bags or compartments a combination pump and valve is located. This pump/valve is connected to a control circuit and is adapted to pump the contents of the absorber bag or compartment into the storage bag or compartment when the contents have reached optimum temperature.

After the pumping of the hot fluid from the absorber bag to the storage means below, an external pump/valve having its inlet near the bottom of the pond refills the absorber bag with cooler water, and the heating cycle repeats. The thickness of the filled absorber bag, and the color of the fluid used can be chosen to facilitate daily batch heating or multiple daily batch heating.

In accordance with one feature of the invention, the storage bag has sufficient slack in its sides so that the contents of the absorber bag can be transferred to the storage pond before the absorber bag is refilled with the cooler water from the bottom of the pond. This eliminates mixing of the solar heated liquid and the cooler fluid from the pond bottom.

In accordance with a further feature of the invention, the storage bag is provided with horizontal partitions which are appropriately perforated, and a deflector is located in the path of the outlet of the pump/valve in order to prevent flow turbulence and to minimize disturbance of the natural temperature gradient within the storage bag, thus assuring that the water drawn from the bottom thereof by the external pump/valve will be the coldest therein.

Radiation and convection losses from the absorber bag are minimized by an air-filled bag integrally mounted atop the absorber bag.

A control circuit is connected to temperature sensors in the absorber bag and the storage bag, and to the two pump/valves to control the operation thereof. Different means for utilizing the thermal energy in the storage ponds are shown.

These and other features and advantages of the invention will become apparent from the drawings and the following detailed description.

BRIEF DESCRIPTION OF THE DRAWINGS

FIGS. 3 and 4 show different means whereby heat may be extracted from the solar pond of FIGS. 1 and 2 for utilization at a point of use. FIG. 5 is a schematic of a modified arrangement.

DETAILED DESCRIPTION OF A PREFERRED EMBODIMENT

Figure 1:
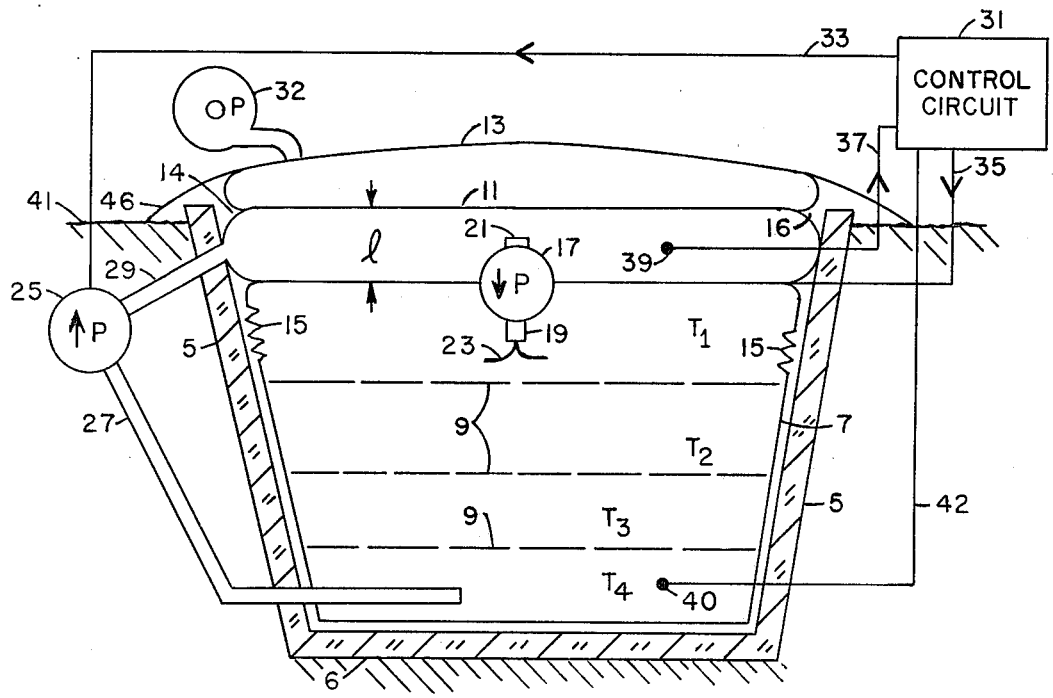
FIGS. 1 and 2 are schematic diagrams of the invention in different phases of its operation.
Figure 2:
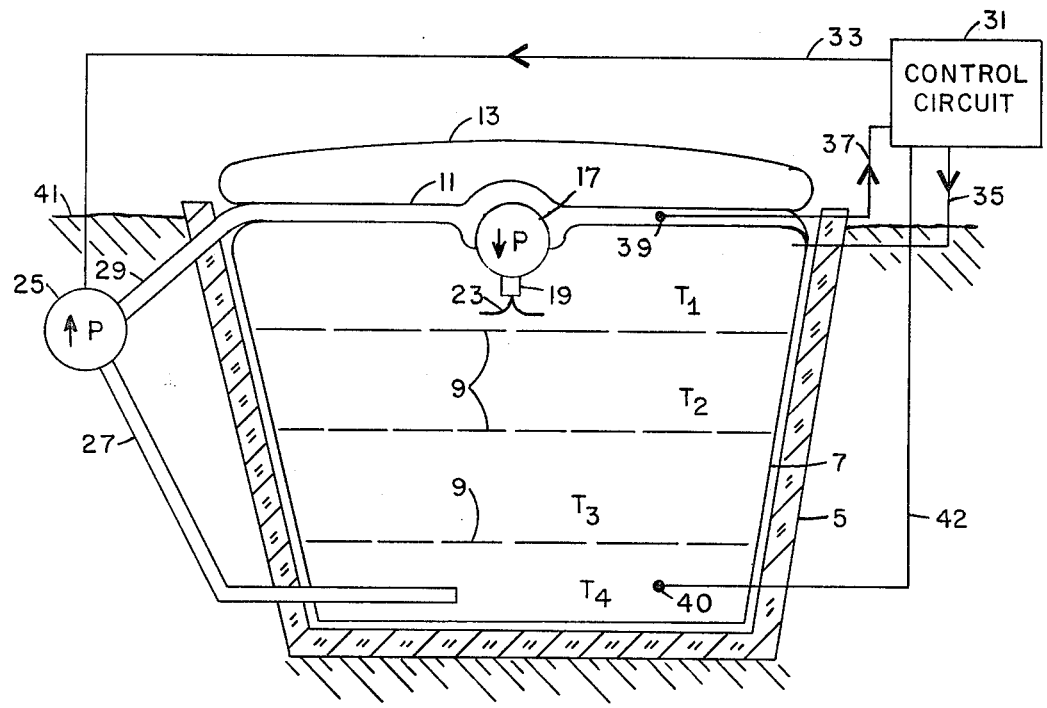

FIGS. 1 and 2 are vertical cross sections in schematic form of one version of the invention. The solar collector and storage pond shown therein is supported inside a containment structure which comprises sidewalls 5 and bottom 6. The sidewalls can be perpendicular or at any practical angle, depending on the chosen constitution and stability of the materials used for this containment structure. Preferably, the containment walls and bottom are made of rigid, insulating material, for example insulating concrete made with polystyrene beads, vermiculite, pumice, or aerated concrete. However, less expensive materials could be used, somewhat compromising storage heat loss and requiring sidewalls angling, for example, a dry rock and sand bed separated by a plastic layer or a pumice and sand bed also separated by a plastic layer. The containment structure is shown underground, with the top of the walls thereof slightly elevated to facilitate precipitation run-off. Surface mounted or even protruding containments could be used, however the buried structure shown utilizes the insulating properties of soil, the structure support of the ground, and results in a low visual profile.

Most of the volume of the containment structure is occupied by the storage pond which in one preferred embodiment may comprise a large flexible storage bag 7, preferably of clear plastic, such as polymer. This bag is contoured to fit the containment structure. Mounted atop the storage bag 7 is absorber bag 11, which covers the horizontal dimensions of the containment structure and thus covers the entire storage bag. Approximately centrally located at the junction of the lower portion of the absorber bag and the upper portion of the storage bag, or at the center of the interface between the absorber and storage compartments, if this embodiment is chosen, is a combination pump/valve 17, which is adapted to pump solar heated fluid from the absorber bag to the upper level of the storage bag. The pump/valve 17 is supported in a hole in both bags or compartments by the material forming the edges of the hole. The pump/valve outlet 19 has a deflector 23 mounted thereon for deflecting the pump output horizontally and non-turbulently. The storage bag or compartment 7 includes a number of horizontal partitions 9 with perforations therein. These partitions may comprise rigid or flexible material, attached to the walls of the bag 7 at spaced points thereon. If flexible material is used, it may be necessary to include one or more vertical spacers, not shown, for supporting and spacing the flexible partitions at several points.

While the absorber bag and the storage bags are illustrated and described as comprising flexible transparent plastic, other materials could be used for these elements. For example, one or both could comprise compartments of rigid transparent material, or as stated above, the solar absorber may comprise merely the upper portion of the storage compartment.

The assembly includes external pump/valve 25 which has its inlet 27 located inside of storage bag 7 near the bottom thereof, and its outlet 29 communicating with the interior of the absorber bag 11. Both of the pump/valves 17 and 25 are of the type including an electrically driven pump with the valve portion arranged to close when the pump is de-energized.

The air-filled bag 13 atop the absorber bag or compartment is inflated with sufficient air pressure to maintain its upper surface in a convex shape at any ambient air temperature. This convex surface prevents the accumulation of things such as rain water, leaves and other debris which would block incoming solar radiation. The air-filled bag or compartment has no bottom surface in that the sides 14 and 16 thereof are bonded to the adjacent edge of the absorber bag or compartment. This results in one less layer of plastic through which the incoming radiation must pass before reaching the absorbing fluid. In principle, however, 13 could be a separate bag sitting atop the absorber bag or compartment, facilitating construction and maintenance, but reducing somewhat the thermal efficiency of the system. Alternatively, the convex shape of the top of the bag or compartment 13 may be maintained by an appropriately sized air blower or compressor 32 which can be continually run or can be arranged to be switched on when the air pressure in the bag falls below a predetermined value and switch off when it reaches another value. The air-filled bag 13 may be equipped with a sloping skirt 46 around its periphery to prevent rainwater and other material from becoming lodged between the containment structure and the absorber and storage bags or compartments. This skirt may comprise any suitable material anchored at its outer edges to the earth 41.

The control circuit 31, which is shown schematically, is connected to pump/valve 25 via lead wire 33 and to pump/valve 17 via lead wire 35. Temperature sensors 39 and 40 are connected to the control circuit via lead wires 37 and 42, to provide the control circuit with the temperature of the absorber bag or compartment fluid and that of the fluid at the bottom of the storage bag or compartment.

The walls of the containment structure are shown as flared slightly, however walls of steeper slope or vertical walls can be utilized. Also, the shape of the structure as viewed from above can take any optional form, for example, circular, square, rectangular, or irregular.

The solar collector comprising the absorber bag or compartment 11 and its radiation absorbing contents function on the principle of volume absorption, which means that the color or blackness of the fluid and its depth 'l' are chosen so that the incoming radiation is, ideally, fully absorbed just before it reaches the bottom of the absorber bag. Also, daily batch heating requires a greater depth or 'l' than does multiple daily batch heating. Obviously, radiation intensity varies widely with latitude, sky conditions and season, and thus the choice of the absorber bag or compartment thickness has to be adjusted to these variables and the use requirements. It has been found that, for a solar energy system such as this one, located in the temperate zone at 40 degrees latitude, an absorber bag with a depth 'l' of 10 cm functioned well for single daily batch heating. With an ambient air temperature of 90 degrees F. on an average summer day, the absorber bag fluid will reach about 190 degrees F. at its maximum, which occurs in mid or late afternoon. For winter conditions, a maximum absorber fluid temperature of about 120 degrees F. can be expected. Further details of radiation absorbing fluids and the dyes utilized therein, suitable for use with this invention can be found in U.S. Pat. No. 4,158,355, by the present applicant.

In the phase of its operation shown in FIG. 1, the absorber bag or compartment 11 has been filled with the black-dyed water which serves as the solar radiation absorbing medium. The same type of fluid fills most of the storage bag or compartment 7. The reference numerals 15 represent slack in the sides of the storage bag 7, since it is designed to hold more liquid than it contains in FIG. 1. As the day progresses, the fluid in the absorber bag 11 rises in temperature toward its maximum. The control circuit can be programmed to transfer the contents of the absorber bag to the storage bag below when the temperature sensor 39 indicates a desired temperature, or at a certain time of day by means of a clock in circuit 31, or by other criteria. Also, it can be arranged to transfer the absorber bag contents when the fluid temperature starts to decrease, regardless of temperature. This type of program might be useful for example if at the end of a cloudy day the absorber fluid were only lukewarm and it was desired to transfer it to the storage bag and replace it with cooler fluid from the bottom thereof. This would minimize the overall heat loss, since the cooler water would insulate the warmer water below it.

In transferring the absorber bag contents to the storage pond below, the control circuit first energizes pump/valve 17 which empties the absorber bag contents into the storage bag without drawing any of the latter's contents into the absorber bag, since pump/valve 25 is closed. Thus the storage bag 7 expands, and the fluid therein rises and the slack 15 in its sides is taken up. The empty absorber bag 11 is now collapsed, as shown in FIG. 2. The deflector 23 and the partitions 9 tend to maintain the natural temperature gradient within the storage bag, with the cooler fluid at the bottom. The different levels $T_1$, $T_2$, etc. in FIGS. 1 and 2 represent decreasing temperature levels within the storage bag. This preservation of the natural temperature gradient means that the coolest fluid is always drawn from the bottom to replenish the absorber bag.

After the absorber bag 11 is emptied, the pump/valve 17 is switched off and the pump/valve 25 switched on until it is again filled with cool fluid from near the bottom of the storage pond. The cycle then repeats. This sequential operation of the two pumps/valves insures that there is no mixing of the hot absorber bag contents with the cooler fluid which replaces it.

With the described system, the absorber bag and its contents plus the air-filled bag serve to insulate the warm fluid stored below in the storage bag.

FIGS. 3 and 4 illustrate two ways in which the stored energy can be withdrawn from the solar pond for remote use. The system of FIGS. 1 and 2 is shown in simplified form with the energy withdrawal apparatus added. In FIG. 3 a heat exchanger 47 has its inlet 48 immersed in the upper level of the storage bag 7, and its outlet 50 near the bottom thereof. When heat is required at the heat exchanger location, the pump 49 is activated by suitable means, not shown. Containment walls 5 are also omitted.

In FIG. 4, the upper level of the storage bag or compartment 7 includes a system of heat transfer tubes 55 running therethrough, which transfer heat to a liquid therein which is then circulated through heat exchanger 51 by means of pump 53. The separate flow system of FIG. 4 has the advantage that a separate liquid can be utilized in the heat exchanger, with the liquid being chosen to optimize the performance of the heat exchanger, or to satisfy other requirements.

If desired, fluid returning from the external heat exchangers in FIGS. 3 and 4 could be automatically returned to a level in the storage pond having a similar temperature. This would involve temperature sensors at each level of the pond plus a sensor at the output of the heat exchanger, together with a mechanically moveable inlet responsive to the outputs of the temperature sensors.

The heat exchangers 47 and 51 of FIGS. 3 and 4 could be represented by a fluid to fluid heat pump, thereby utilizing the stored thermal energy in the most efficient fashion. Pumps 49 and 53 would be integral parts of such a heat pump.

While the absorber bag thus far has been shown and described as atop the storage pond, it may in some cases be desirable or convenient to place these two elements at separate locations. This could easily be accomplished simply by extending the fluid conduit means which connect these two elements. For example, the absorber bag or compartment could be located on the roof of a building and the storage bag or compartment in the basement of the building or somewhere on the grounds thereof, either on the surface or underground. The diagrammatic FIG. 5 depicts the potential separation/location of these two elements. Primed reference characters are used to denote components corresponding to those bearing the same principal or unprimed reference characters in the preceding description. In this embodiment, separate air-filled insulating bags 13' and 13" are used as shown in association with the respectively separated absorber compartment 11' and storage compartment 7'. Thus, radiation and convection losses for each compartment are minimized as in the first described embodiment.

While the invention has been described in connection with preferred embodiments, variations therein are possible without exercising invention, thus the invention should be limited only by the scope of the appended claims.

I claim:

1. A combined solar energy collector and solar energy storage pond assembly, comprising: a walled liquid containment structure adapted to be recessed within and supported by the surrounding ground, said containment structure including wall linings comprised of rigid supportive and insulating material; a large flexible liquid impervious plastic bag adapted to fill most of the interior of said containment structure and contoured to the walls thereof and filled or nearly filled with a black radiation absorbing liquid, said large plastic bag and its contents constituting said storage pond; said large plastic bag further comprising a plurality of perforated horizontal partitions at different levels therein; said solar energy collector comprising a smaller absorber bag or compartment of clear flexible, liquid impervious plastic, said absorber bag or compartment situated atop said storage pond approximately at ground level and covering the entire storage pond, a hole in the upper surface of said large bag or compartment and in the adjoining lower surface of said absorber bag or compartment, a first pump/valve located in said holes and supported thereby, a second pump/valve having its inlet located near the bottom of said storage pond with its outlet communicating with the interior of said absorber bag or compartment, an air-filled bag with a convex upper surface mounted atop said absorber bag or compartment, temperature sensors located inside of said absorber bag or compartment and near the bottom of said storage pond, said sensors being connected to a control circuit, said control circuit being connected to both of said pump/valves, said absorber bag or compartment adapted to be filled with said black radiation absorbing liquid for solar heating thereof; said storage bag or compartment, during said heating of said absorber bag or compartment liquid, being nearly filled with the same type of liquid but having sufficient unfilled volume to absorb the contents of said absorber bag or compartment; said control circuit being adapted to energize said first pump/valve when the heating of the contents of said absorber bag or compartment is complete, to thereby transfer the heated liquid to the storage pond below, and to sequentially energize said second pump/valve to re-fill the absorber bag or compartment with cool liquid from the bottom of said storage pond.

2. The assembly of claim 1 wherein the depth of said absorber bag or compartment and the color density of the radiation absorbing liquid therein is chosen to facilitate daily batch heating, whereby maximum absorber bag or compartment fluid temperature will occur in mid or late afternoon, and said control circuit is arranged to operate said pump/valves when said maximum temperature is reached.

3. The assembly of claim 1 wherein said air-filled bag is maintained in said convex shape by an air blower or compressor arranged to inflate it.

4. The assembly of claim 1 wherein the shape of said assembly, as viewed from above is of any optional form such as round, and wherein optimal dimensions have been devised to accomodate collection and storage criteria, and thermal storage capacity requirements.

5. The assembly of claim 1, further including a means for utilizing the heat energy therein comprising: a remote heat exchanger connected to said assembly, the inlet of said heat exchanger being located within said storage pond near the top thereof and the outlet of said heat exchanger being in said storage pond near the bottom thereof, whereby a portion of the fluid in said storage pond can be passed through said heat exchanger.

6. The assembly of claim 1, further comprising a means for utilizing the heat energy therein, comprising: a remote heat exchanger connected to said assembly by means of a system of heat transfer tubes running through the upper level of said storage pond, whereby said heat exchanger utilizes a separate fluid.

7. A combined solar energy collector and solar energy storage pond assembly comprising: a storage pond comprising a large flexible plastic bag supported in the lower portion of a containment structure and occupying most of the volume of said containment, said large plastic bag being filled or nearly filled with black radiation absorbing fluid; said energy collector comprising a smaller absorber bag or compartment of clear, flexible plastic covering the top of said storage pond and adapted to be filled with said black radiation absorbing fluid; a first pump/valve mounted in a hole in the top surface of said large bag or compartment and the bottom surface of said absorber bag or compartment, said pump/valve being adapted to pump heated radiation absorbing fluid from said absorber bag or compartment to said storage pond; and a second pump/valve adapted to pump cool radiation absorbing fluid from the bottom of said storage pond to the absorber bag or compartment after said absorber bag or compartment has been emptied by said first pump/valve.

8. The assembly of claim 7 wherein said large plastic bag includes a plurality of horizontal partitions with perforations therein, and the outlet of said first pump/valve includes a deflector for deflecting the output thereof horizontally in a non-turbulent fashion.

9. The assembly of claim 7, further including a control circuit means for controlling the sequential operation of said first and second pumps/valves.

10. A combined solar energy collector and solar energy storage pond assembly comprising: A storage pond comprising a large flexible plastic bag supported in the lower portion of a containment structure and occupying most of the volume of said containment, said large plastic bag being filled or nearly filled with black radiation absorbing fluid; said energy collector comprising a smaller absorber bag or compartment of clear, flexible plastic adapted to be filled with said black radiation absorbing fluid; a first pump/valve mounted in a hole in the top surface of said large bag or compartment and the bottom surface of said absorber bag or compartment, said pump/valve being adapted to pump heated radiation absorbing fluid from said absorber bag or compartment to said storage pond; and a second pump/valve adapted to pump cool radiation absorbing fluid from the bottom of said storage pond to the absorber bag or compartment after said absorber bag or compartment has been emptied by said first pump/valve.

11. The assembly of claim 1 wherein the shape of said assembly, as viewed from above is of any optional form such as rectangular, and wherein optimal dimensions have been devised to accomodate collection and storage criteria, and thermal storage capacity requirements.

12. The assembly of claim 1 wherein the shape of said assembly, as viewed from above is of any convenient form, such as round or rectangular, and wherein specific dimensions have been devised, which are dependent on the user's (residential, industrial, agricultural) thermal requirements, use pattern (time period within twenty-four hours), geography (latitude), and predominant weather pattern (average temperature and cloud cover) of and at the specific location of application.

13. The assembly of claim 10 wherein said storage pond and said energy collector are placed in different locations, being chosen to optimize the heat absorbing function of said energy collector and the energy storage function of said storage pond.

14. The assembly of claim 13 wherein said storage pond includes a plurality of perforated horizontal partitions to minimize disturbances to the natural temperature gradient therein.

* * * * *